Feb. 19, 1952     A. G. F. WALLGREN     2,586,406
DOUBLE ROW ROLLER BEARING
Filed June 11, 1947
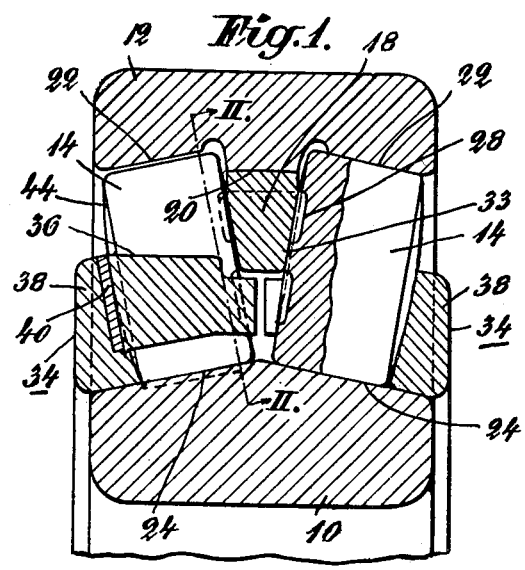
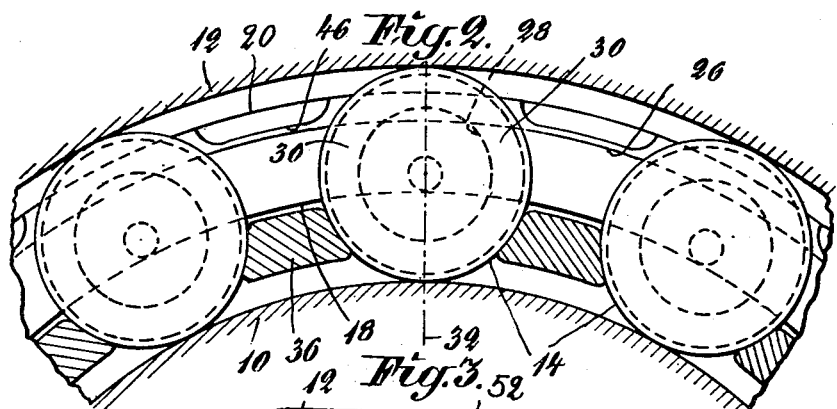
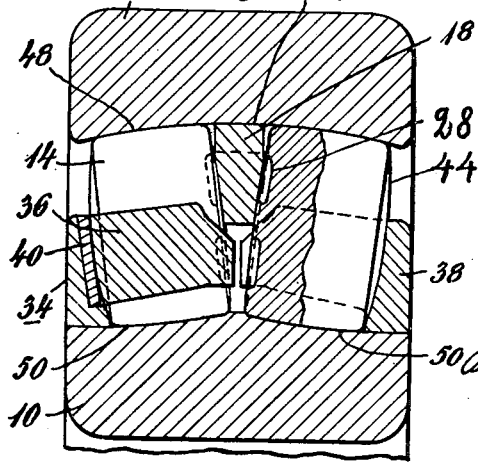
INVENTOR.
August Gunnar Ferdinand Wallgren
ATTORNEY Patented Feb. 19, 1952

2,586,406

UNITED STATES PATENT OFFICE 2,586,406

DOUBLE ROW ROLLER BEARING

August Gunnar Ferdinand Wallgren,
Stockholm, Sweden

Application June 11, 1947, Serial No. 753,960
In Sweden June 14, 1946

7 Claims. (Cl. 308—214)

My invention relates to double row roller bearings having outer and inner bearing ring members and rollers arranged between the members. The rollers are in cooperation with race-ways on the ring members and guide surfaces supporting the one end surface of the rollers, axially fixed in both directions, so as to sustain axial thrusts in addition to radial thrusts. More particularly the invention relates to double row roller bearings having conical or approximately conical rollers, in which bearings the outer ring is to be subjected to an elastic deformation, for the purpose of inserting the desired number of rollers between the bearing ring members. A main object of the invention is to provide a roller bearing of this type, in which the outer ring member can have a great deformation, so that the number of rollers in the bearing becomes correspondingly large, while a proper guidance at the same time is ensured for the rollers.

Double row roller bearings of the above type are known, which have spherically shaped raceways for the rollers and a spherically shaped internal surface on the outer bearing ring member, the guide surfaces for the roller in said bearings being provided on a separate guide ring inserted between the two rows of rollers. This guide ring has a spherical surface fitting to the spherical surface of the outer bearing ring member. It was found, however, that this type of roller bearing does not operate satisfactorily, particularly due to the fact that the ring has a small extension in radial direction, whereby the rollers will be improperly guided so as to tend to take an oblique position. It is also the object of the invention to eliminate this drawback.

A further object of the invention is to provide a bearing having a reliable function with an appreciable load capacity, both radially and axially. Another object is to provide a roller cage permitting the provision of a guide ring of relatively great axial extent, so that the contact surfaces between the same and the rollers are disposed inwardly toward the central portions of the latter. In the conical bearing, a special advantage is obtained in so far as the guide ring will not be critical for the magnitude of the deformation to which the outer ring member can be subjected in the assembly of the rollers.

Further objects and advantages of the invention will be apparent from the following description considered in connection with the accompanying drawing which forms a part of this specification, and of which:

Fig. 1 is a longitudinal sectional view of a portion of a double row conical bearing according to one embodiment of the invention.

Fig. 2 is a sectional view of the bearing taken on the line II—II of Fig. 1, and Fig. 3 is a longitudinal sectional view of a portion of a double row spherical bearing according to a second embodiment of the invention.

In the drawing 10 designates the inner ring and 12 the outer ring of the bearing, both of which rings are integral and have two rows of conical rollers 14 inserted therebetween. These rollers bear with their inner end surfaces, which are of a slightly convex spherical shape, against a ring 18 forming a separate element. The ring 18 fits with a surface 20, preferably of spherical shape, in the central portion of the outer ring 12. The ring 12 is primarily shrunk onto the ring 18 in a manner known per se, so that the two rings become immovably united with each other, especially in axial direction.

The outer ring 12 has two race-ways 22 of a conical or approximately conical shape, the diameter of which increases in a direction toward the centre of the outer ring. Likewise, the inner ring 10 carries two conical or approximately conical race-ways 24, one for each row of rollers, the diameter of which increases in a direction toward the centre of the ring. The race-ways 22, 24 for a row of rollers converge, the same as the conical surface of the rollers, in a manner such as to form a portion of the envelope surface of cones, the apexes of which meet at a common point on the bearing axis, which point is located on the same side of the centre of the bearing as the row of rollers involved. The position of the rollers 14 is axially fixed in both directions because of such form of the race-ways and by reason of the presence of the central guide ring 18.

The outer portion of the guide ring 18 is bevelled off from the line 26 in Fig. 2, by reason of which there is no contact between the rollers and the guide ring outside said line. Furthermore, it is of advantage to provide an annular groove 28 in the lateral surface of the rollers. Thus the rollers obtain two contact surfaces 30 against the guide ring, indicated in Fig. 2 as surfaces hatched by dash lines. Due to the fact that the guide ring 18 has a great extent in radial direction the two surfaces 30 will be retracted toward the centre of the rollers. Furthermore, the surfaces 30 are located at a comparatively great distance from the central plane 32 of the rollers, by reason of which the moment arm counteracting an oblique position of the rollers is relatively long. On the other hand, such portions of the end surfaces of the rollers that are situated far out radially or adjacent to the central plane 32, and are thus less suitable for the guidance of the rollers, have been eliminated, as will appear from the above. At the centre of the rollers, there is preferably left an abutment 33, the outer surface of which forms a portion of the same sphere as the surfaces 30, and to which the measuring tool is applied to control the dimensions of the roller.

It will be readily understood that the fact that the guide ring 18 forms a separate element makes it possible to subject the outer ring 12 to a greater elastic deformation, when the rollers are introduced between the rings, than if it were provided with an inwardly extending flange. This advantage holds true, even if the guide ring and the outer ring be united mutually by shrinking, inasmuch as such shrinking only results in the force required for the deformation becoming correspondingly greater. The result is that the rollers 14 may be given a larger guide ring surface so as to impart improved properties to the bearing.

The relative position of the rollers is ensured by means of a roller cage for each row of rollers, such cage being generally designated by 34. This roller cage is composed of supporting members or arms 36 projecting between the rollers and of a preferably integral cage ring 38. The supporting members and the cage ring are rigidly united with each other through the intermediary of plates 40 soldered to the parts in question. To this end, the supporting members and the cage ring are preferably made from non-magnetic material, such as bronze, where the plate 40 is made from material, primarily iron, and the soldering is effected in such a manner that the plates, on having been coated with the soldering metal, such as hard solder or silver, are subjected to a high frequency field adapted to heat the soldering metal to fusion within a fraction of a second. During this heat treatment, the cage ring 38 is subjected to a pressure, while the supporting members contact one another with their inner portions in the two roller cages 34. The pressure acting upon the cage ring during the soldering operation brings about an elastic deformation of the portions of the ring situated between the rollers, and when the pressure ceases, the supporting members will be removed from each other, so that the contact between them is interrupted. By making those end surfaces 44 of the rollers, against which the cage ring 38 bears in the soldering operation, rounded, or by otherwise providing the same with a projecting central portion, for example, the cage ring will bear on the rollers at said central portion only, by reason of which the portion of the cage ring subjected to an elastic deformation becomes correspondingly extended, which in turn results in the displacement of the cage ring and thus of the supporting members in the axial direction being comparatively great. This ensures that the clearance between the supporting members of the finished bearing will be of sufficient magnitude.

The supporting members 36 have a shape conforming to the conical surfaces of the rollers, in a manner such that the supporting members may be introduced between the rollers at a parallel displacement in a direction coinciding at least approximately with the axial direction of the rollers, while the supporting members are at the same time prevented by the rollers from being drawn out in the direction of the bearing axis, by the fact that the spaces between the rollers, over a certain portion at least, diminish in width in said direction from the centre of the bearing and outwardly toward the sides. As will appear from Fig. 1, the supporting members are disposed nearer to the inner ring than to the outer ring, and the cage rings 38 are centered on the inner ring 10. In the finished bearing, in which the supporting members 36 are rigidly connected with the cage ring 38 and consequently cannot alter their angular position, the supporting members, as will appear from the above, will ensure the position of the roller cages 34 in the bearing, in spite of the fact that the supporting members are united only at the outer side of the bearing. This in turn involves the space being provided in radial direction for the guide ring 18, so that the latter may be given the above-mentioned great extension in radial direction.

The guide ring is preferably provided at the outer periphery thereof with recesses 46 at points distributed round the circumference, said recesses providing for communication for the lubricant between the two rows of rollers.

The embodiment according to Fig. 3 differs from the preceding one substantially in that the rollers 14 have spherical race-ways, and that the outer ring has a corresponding spherical surface 48 extending all over the width thereof. The inner ring 10 is formed with two race-ways 50 of a corresponding configuration in known manner. Inserted between the two rows of rollers is a guide ring 18, which in this case has an outer spherical surface 52 corresponding to the spherical surface 48 of the outer ring. Here, the guide ring 18 is movable relative to the outer ring 12, so that the bearing becomes self-adjusting at oblique positions or bends of the shaft carried by the bearing. Due to the fact that the roller cages 34 are shaped as described above, the guide ring 18 attains a great length radially, and at the same time the above-mentioned advantages with respect to the guidance of the rollers are obtained. Here, too, there are contact surfaces 30 according to Fig. 2 between the guide ring and the roller cages, said contact surfaces being retracted toward the centre of the roller at a relatively great distance from the plane 32 about which an oblique position of the rollers may occur.

In the embodiment according to Fig. 3, the roller cages need not necessarily be assembled after the rollers have been arranged in their positions between the bearing rings 10, 12; it being possible to introduce the rollers into the finished roller cage, after the latter has been arranged in its position and after the ring 10 has been swung out 90° relative to the ring 12.

If desired, the guide ring 18 may be composed of two or more part rings shrunk onto each other.

While two more or less specific embodiments of the invention have been shown, it is to be understood that this is for purpose of illustration only, and that the invention is not to be limited thereby, but its scope is to be determined by the appended claims.

What I claim is:

1. A double row roller bearing having outer and inner bearing ring members and rollers arranged therebetween, said rollers being axially fixed in both directions by race-ways on the ring members and guide surfaces bearing against one end surface of the rollers, characterized by the provision of supporting members between the rollers, said supporting members being locked by the rollers in a direction outwardly from the centre of the bearing, while being rigidly connected with peripherally extending cage rings at the outer sides of the bearing only, there being provided a guide ring forming a separate element between the rows of rollers, said guide ring having the guide surfaces disposed thereon.

2. A double row roller bearing according to claim 1, in which the rollers are of a conical shape, in substance at least, and have their large end directed toward the centre of the bearing, and that the guide ring is arranged between the two rows of conical rollers while bearing on the outer ring.

3. A double row roller bearing according to claim 1 in which the guide ring is shrunk onto the outer bearing ring.

4. A double row roller bearing according to claim 1, in which the end surfaces of the rollers have a radially outer zone relieved of the guide ring.

5. A double row roller bearing according to claim 1, in which the guide ring supporting the outer bearing ring is provided with recesses at its outer peripheral portion, said recesses permitting a passage of lubricant from one side of the bearing to the other.

6. A double row roller bearing according to claim 1 in which the end surface of each roller facing the guide ring has a recess located radially inwardly of the periphery of the roller, so that a radially inner zone is produced without any bearing on the guide ring.

7. A double row roller bearing according to claim 6 in which said recess is of annular form to provide a boss at the center of said end surface.

AUGUST GUNNAR FERDINAND WALLGREN.

REFERENCES CITED

The following references are of record in the file of this patent:

UNITED STATES PATENTS

| Number | Name | Date |
| --- | --- | --- |
| 1,356,326 | Palmgren | Oct. 19, 1920 |
| 1,918,677 | Wingquist | July 18, 1933 |
| 1,941,460 | Boden | Jan. 2, 1934 |
| 2,375,145 | Styri | May 1, 1945 |